United States Patent [19]
Shiota

[11] Patent Number: 4,920,423
[45] Date of Patent: Apr. 24, 1990

[54] VIDEO PRINTER

[75] Inventor: Kazuo Shiota, Kanagawa, Japan

[73] Assignee: Fuji Photo Film Co., Ltd., Kanagawa, Japan

[21] Appl. No.: 215,145

[22] Filed: Jul. 5, 1988

[30] Foreign Application Priority Data

Jul. 3, 1987 [JP] Japan .................................. 62-167534

[51] Int. Cl.⁵ ............................................. H04N 5/76
[52] U.S. Cl. ...................................... 358/335; 360/14.1
[58] Field of Search ........................ 360/14.1, 14.3, 15, 360/33.1; 358/310, 311, 335, 22, 75, 105, 108, 78

[56] References Cited

U.S. PATENT DOCUMENTS

| 3,885,090 | 5/1975 | Rosenbaum | 358/105 |
|---|---|---|---|
| 3,924,130 | 12/1975 | Cohen et al. | 358/105 |
| 4,130,834 | 12/1978 | Mender et al. | 358/335 |
| 4,262,301 | 4/1981 | Erlichman | 358/906 |
| 4,523,227 | 6/1985 | Hurst | 358/335 |
| 4,532,558 | 7/1985 | Oota et al. | 358/906 |
| 4,538,188 | 8/1985 | Barker et al. | 360/14.3 |
| 4,555,803 | 11/1985 | Hirose | 358/335 |
| 4,685,003 | 8/1987 | Westland | 360/14.1 |
| 4,763,186 | 8/1988 | Belmares-Sarabia et al. | 358/22 |
| 4,777,526 | 10/1988 | Saitoh et al. | 358/108 |
| 4,805,039 | 2/1989 | Otake et al. | 358/335 |

FOREIGN PATENT DOCUMENTS 60-14583 1/1985 Japan .................................. 360/14.1

Primary Examiner—Donald McElheny, Jr.
Attorney, Agent, or Firm—Sughrue, Mion, Zinn, Macpeak & Seas

[57] ABSTRACT

A video printer for making a print of main frames of different scenes of a video motion picture or animation recorded on a video tape, video floppy or the like can detect automatically one frame for each scene. For detecting a scene transition, the video printer is provided with a frame comparing device for comparing video signals of every pair of two adjacent frames reproduced time serially to provide a signal representative of the degree of correlation thereof. A judging device determines that there is a scene transition when the frame comparing device provides a signal larger than a preset signal. The video printer makes a print of a first frame reproduced after a lapse of a predetermined time period after the detection of the transition of scene. The main frames of the different scenes are printed as a composite image to provide an index print for demonstrating the contents of a video tape.

15 Claims, 4 Drawing Sheets

VIDEO PRINTER

BACKGROUND OF THE INVENTION

The present invention relates to a video printer, and more particularly, to a video printer for making a hard copy of each frame of a scene of a video motion picture or the like.

Several kinds of video printers, such as CRT video printers, laser video printers, LED laser printers and inkjet printers, are known for transforming a video image into a visible image. For instance, in a CRT video printer, continuous video images such as a video motion picture or a video animation reproduced by a video tape player or taken by a TV camera are displayed on a CRT after appropriate image processing and are printed on a photographic material as a hard copy.

In order to know what scenes are recorded on a video recording medium such as a video tape, video floppy disk, or the like before being replayed, it is convenient to attach a general scene index including stills of various scenes recorded on the recording tape or disk (a so-called index print). For providing such index prints, at least one frame of each scene of the continuous video images recorded on, for example, a video tape is printed as a hard copy. The video tape is played by a video tape player (VTP) and is observed on a TV screen to identify a frame number of a frame of each scene desired to be printed. Thereafter, the video tape is replayed to make hard copies of frames like stills with reference to the noted frame numbers frame by frame. Otherwise, the frames for which hard copies are desired are recorded in an electrical or magnetic recording medium such as a video floppy disk. Then, the frames recorded in the floppy disk are reproduced for printing on a frame by frame basis. These stills are edited as an index print to provide a brief demonstration of the contents of the video tape.

In any way to make hard copies as index still prints, it is a somewhat troublesome and time consuming operation to make a hard copy of scenes of a continuous video images on a frame by frame basis. In particular, the latter manner leads to a deterioration of image quality because an image is reproduced as image signals from a video tape or floppy and then is printed. In addition, the latter manner requires an extra VTP.

SUMMARY OF THE INVENTION

In view of the foregoing, it is an object of the present invention to provide a video printer for printing a main frame of each scene of a video motion picture or a video animation recorded on a video recording medium.

It is another object of the present invention to provide a video printer which can pick up a main frame of each scene to be printed.

Because ordinary video motion pictures or video animations include a plurality of different scenes therein, there are scene transitions. To demonstrate the contents of a video tape, an index print is provided which includes one frame still for each scene. According to experiments, frames included in one scene are relatively closely correlated, but two adjacent frames of two different scenes are generally poorly correlated. Therefore, a scene transition can be judged based on the degree of correlation between adjacent frames of the two different scenes.

A video printer according to the present invention comprises means for detecting a degree of correlation between two adjacent frames of a video motion picture or video animation reproduced time serially from a video recording medium; means for comparing the detected degree of correlation with a preset degree; and means for printing a frame as a hard copy a predetermined time period after the detecting means detects a degree of correlation lower than the preset degree. The degree of correlation is provided as an electric signal from a comparator by comparing video signals of each pair of adjacent frames. The comparator provides an electric signal higher than a certain preset value when the degree of correlation is poor and lower when the degree of correlation is good. Thus, if a higher output is provided, it is judged that there is a scene transition between the compared adjacent frames. Based on that judgment, a frame reproduced after a lapse of a predetermined time period is printed.

In a single scene, there is a main subject which often stands still. Therefore, there are usually two adjacent frames in the same scene which are very closely correlated. According to another preferred embodiment of the present invention, the video printer is provided with means for comparing the detected value of the degree of correlation between each two adjacent frames in the same scene with another preset correlation degree value which is lower than that for judgment of scene transition. When the comparing means provides an output representative of the value of the degree of correlation between each two adjacent frames in a same scene lower than the preset value, either one of the adjacent frames is printed. If there is no output lower than the preset value for a predetermined time period, then the first frame reproduced after the predetermined time period is printed.

DETAILED DESCRIPTION OF THE PREFERRED EMBODIMENT

Figure 1:
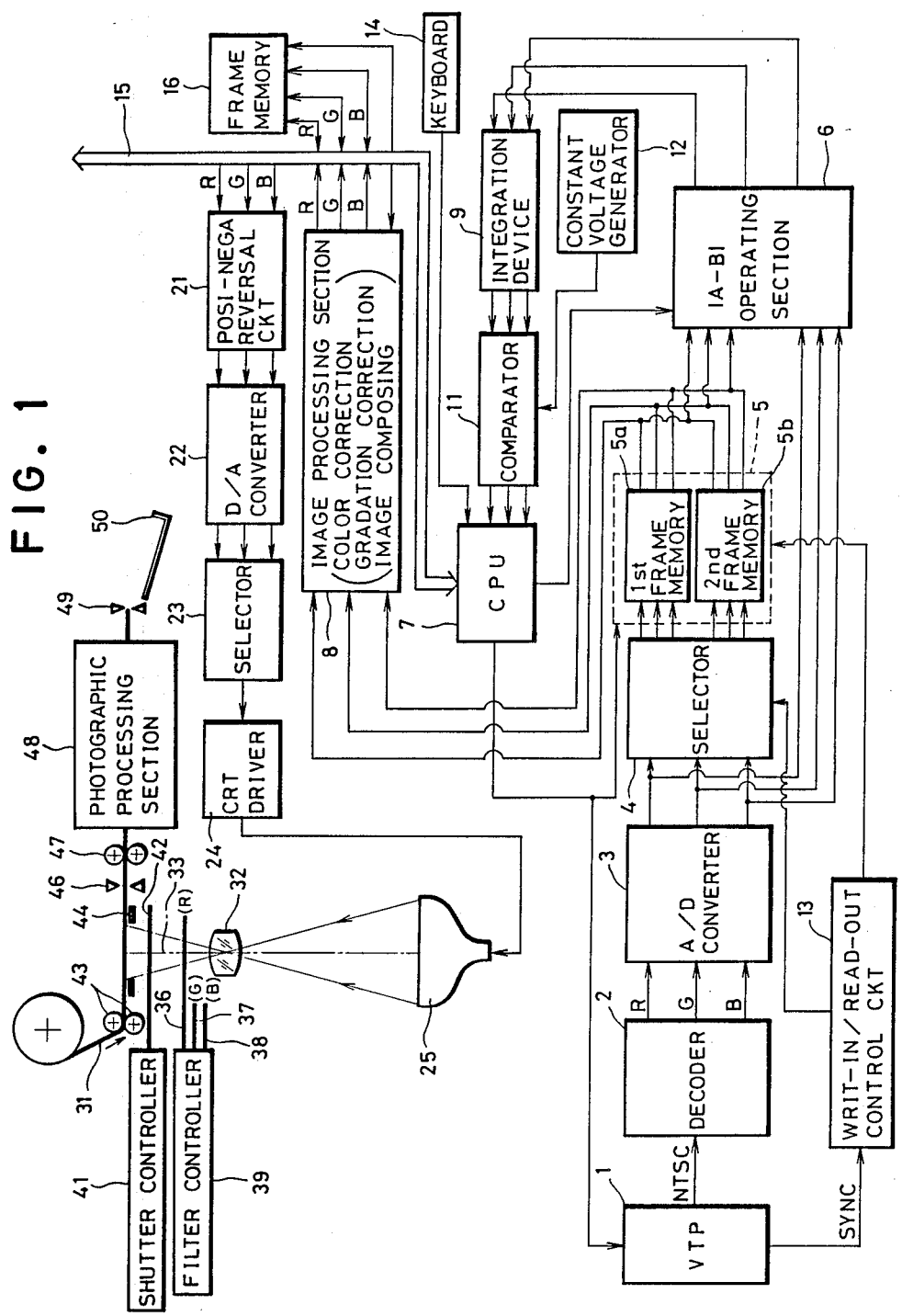
FIG. 1 is a schematic block diagram showing a video printer according to a preferred embodiment of the present invention.

FIG. 1 shows a CRT video printer embodying the present invention. A video tape player 1 (hereinafter abbreviated as VTP for descriptive purposes) is used an an image input device to reproduce color images recorded on video tape. As is well known, a first frame of a color video image is reproduced in the form of an NTSC signal. A decoder 2 is provided to separate the NTSC signals into three color video signals, namely red (R), green (G) and blue (B). These three color video signals (R), (G) and (B) are converted to digital signals in parallel by an A/D converter 3. This CRT video printer may be used together with a color TV camera in place of the VTP 1, in which case the color TV camera would be connected directly to the A/D converter 3.

The three digitized color video signals are transmitted simultaneously to a frame memory section 5 through a selector 4 and a $|A-B|$ operating section 6. This selector 4 is controlled by a write-in/read-out control circuit 13 to selectively transmit the three color video signals (R), (G) and (B) to first and second frame memories 5a and 5b of the frame memory section 5. Each frame memory 5a, 5b has three memory areas, one for each color, to read in and read out therefrom each color video signals under control of the write-in/read-out control circuit 13.

The three color video signals of a frame A read out by the first or second frame memory 5a or 5b are sent to the |A−B| operating section 6. This video signal read-out operation is synchronized with outputting video signals of the subsequent frame B reproduced from the VTP 1. The |A−B| operating section 6 receives the video signals of the frame A from the frame memory section 5 and the video signals of the frame B read out from the VTP 1 through the decoder 2 and the A/D converter 3. The |A−B| operating section 6 executes the |A−B| operation for each color (R), (G), (B) to obtain the difference between the video signals of adjacent frames A and B for each color, the difference in turn being sent to an integration device 9.

The integration device 9 integrates the difference of the video signals between the frames A and B by color, and sends the resulting integrated values to a comparator 11 which is connected to a constant voltage generator 12. The integrated value is given as a reciprocal of a correlation value between the adjacent two frames. Assuming that the integrated value and the output of a preset value from the constant voltage generator are "X" and "Y", respectively, the comparator 11 provides a CPU 7 with a high level only when the output value "X" is larger than the preset value "Y", and otherwise provides a low level.

The CPU 7 judges the two adjacent frames A and B to have a close correlation which means that they are included in a substantially similar scene when it receives a low level from the comparator 11 and, on the other hand, judges the two frames to be remotely connected to each other (i.e.) that they belong to different scenes) when it receives an "H" signal from the comparator 11.

An image processing section S is actuated to perform color correction, gradation correction and image composition for video signals sent from the frame memory 5 only when an indication is given by the CPU 7 to provide a composite video image comprising a plurality of inlaid frames, (i.e.) an index print. Specifically, such image processing is effected by thinning out video signals which have been subjected to color and gradation corrections to reduce the size of each frame. An index print format instruction, indicating numbers of columns and rows of frames, is given through the keyboard 14 connected to the CPU 7. It is possible to inlay the frame number for each reduced frame image. The video image processed in the image processing section 8 is sent to a printing system through a bus line 15.

A frame memory 16 comprises three memory sections for memorizing video signals for red, green and blue, respectively, and is used when index prints are made. To make an index print, video signals are written in proper areas of the frame memory 16 addressed by the CPU 7 through the bus line 15 after having been subjected to image processing to reduce the size of the image in the image processing section 8.

A black-and-white CRT 25 displays the video signals as black-and-white negative images in the form of a brightness pattern for each mono-color image which is selected by a selector 23. A photographic material, such as a color photographic paper 31, faces the CRT 25, and is exposed to each color of black-and-white negative image displayed on the CRT 25 through a printing lens 32. Between the color photographic paper 31 and the printing lens 32 there are disposed three color filters 36, 37 and 38, namely red (R), green (G) and blue (B) filters, each insertable into the optical path 33 of the printing lens 32 independently of the other two. A filter driver 39 drives these color filters 36 to 38 to insert each filter into the optical path 33 to effect an additive frame sequence exposure. A shutter 42, controlled by a shutter controller 41, is disposed between the color photographic paper 31 and the color filters 36 to 38, and opens and closes for a suitable exposure time for each color three times in all for a complete video image.

The color photographic paper 31, which is in the form of a roll, is intermittently withdrawn by a pair of withdrawing rollers 43, and is placed in an exposure station defined by a framing mask 44, in which a number of images are printed on the color photographic paper 31 on a frame by frame basis. After the exposure of a predetermined number of images, the color photographic paper 31 is cut off by a cutter 46 and then is transported toward a processing section 48 by a pair of rollers 47. The processed color photographic paper 31 is cut into individual print frames by a cutter 49, and the frames are delivered into a tray 50.

Figure 2:
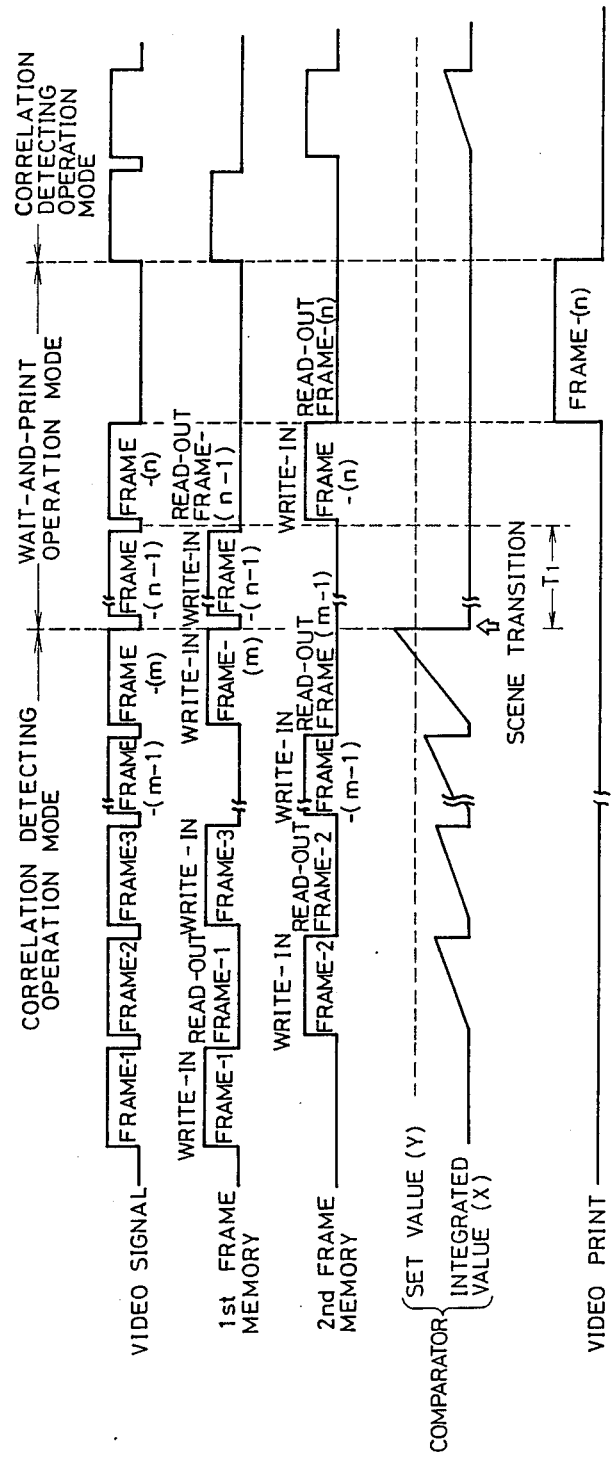
FIG. 2 is a time chart showing operation of the video printer of FIG. 1.

FIG. 2 shows a time chart of operation of the video printer of FIG. 1 When the keyboard 14 is operated, the VTP 1 starts to reproduce a first frame (which is referred to as Frame-1) of the video image in the form of NTSC video signals which are separated into three color video signals by the decoder 2. After being converted into a digital form by the A/D converter 3, the three digitized color signals are sent to the selector 4. The write-in/read-out control circuit 13 receives synchronizing signals for reproducing the Frame-1 from the VTP 1, and sends instruction signals synchronized with the received synchronizing signals to the selector 4 and the frame memory section 5. The selector 4 transfers the video signals from the A/D converter 3 to the first frame memory 5a to write the video signals in the frame memory 5a.

When the VTP 1 reproduces a second frame, or Frame-2, of the video image, the write-in/read-out control circuit 13 receives synchronizing signals for reproducing the Frame-2 from the VTP 1 and sends instruction signals synchronized with the received synchronizing signals to the selector 4 and the frame memory section 5. The selector 4 transfers the video signals of the Frame-2 to the second frame memory 5b. In the frame memory section 5, the first frame memory 5a reads out the video signals of the Frame-1 simultaneously with the writing in the video signals of the Frame-2 in the second frame memory 5b.

While the first frame memory 5a reads out the video signals of the Frame-1 and the second frame memory 5b writes in the video signals of the Fram-2, the video signals of the Frame-2 from the A/D converter 3 are transferred to the |A−B| operating section 6. On the other hand, the video signals of the Frame-1 read out by the first frame memory 5a are also transferred to the |A−B| operating section 6. Therefore, the operating section 6 performs an operation |video signal of Frame-1 - video signal of Frame-2| by picture element for each color to obtain the difference between the time serially adjacent image frames and sends the difference as signals to the integration device 9. The integration device 9 integrates the output from the |A−B| operating section 6 and sends the result to the comparator 11. For example, if the correlative value between the Frame-1 and Frame-2 is large, the integration device 9 provides an output "X" smaller than the set value "Y" of the constant voltage generator 12; the comparator 11 provides the low level for each color which is sent to the CPU 7. The CPU 7, when receiving the low level for the three colors, determines that Frame-1 and Frame-2 are from the same scene.

In the correlation determining operation mode, the CPU 7 determines the correlation of each two time serially reproduced adjacent frames. If the correlation value between the m-th and (m−1)th frames, namely Frame-(m) and Frame-(m−1), is small, an output "X" from the integration device 9 becomes larger than the set value "Y", so that the comparator 11 provides the CPU 7 with a high level. Therefore, the CPU 7 determines the Frame-(m) and Frame-(m−1) to be of different scenes. This is what is referred to in the specification as a scene transition.

In the event of an occurrence of the scene transition, the operation enters a wait-and-print operation mode at the end of the correlation determining operation mode. When entering the wait-and-print operation mode, the |A−B| operating section 6 terminates its operation. At the end of a time period $T_1$ after the occurrence of the scene transition, the CPU 7 controls the frame memory section 5 to stop its writing operation and the VTP 1 to stop its reproducing operation. At this time, if video signals of a n-th frame (Frame-n) are being written in the frame memory section 5, the VTP 1 is stopped after the completion of that writing.

Consequently, the CPU 7 reads out the three color video signals of, for example, the Frame-(n) from the frame memory 5a, and sends them to the image processing section 8 for image processing. Thereafter, a printing sequence of operation is called for. The video signals of the Frame-(n) are sent out to a selector 23 through a negative-positive reversal circuit 21 and a D/A converter 22. The selector 23 first retrieves the video signals for, for example, red, and transmits them to the black-and-white CRT 25 to display a black-and-white image in the form of a brightness pattern transformed from the red negative image. The red filter 36 is inserted into the printing path 33 of the printing lens 32 to convert the black-and-white image into a red image, while the black-and-white CRT 25 is displaying the black-and-white image. At this time, the shutter 42 opens for a proper time which is determined in accordance with the sensitivity of the color photographic paper 31 to red light to print the red image on the color photographic paper 31.

After printing the red image, the shutter 42 is closed to allow the red filter 36 in the printing path to be replaced with the green filter 37. Simultaneously, the black-and-white CRT 25 displays a black-and-white image of a green negative image in the form of a brightness pattern. When the shutter 42 opens, the green image is printed over the red on the color photographic paper 31 in the same way as the red image is printed. Similarly, the blue image is printed over the red and green images on the color photographic paper 31 to form a color image in a three color frame sequential exposure. Consequently, when a frame at which the scene transition occurs is printed on the color photographic paper 31, the wait-and-print operation mode terminates. When the Frame-(n) is printed, the CPU 7 causes again the VTP 1 to reproduce frames in order to detect the occurrence of the scene transition.

In the foregoing embodiment, a frame is printed at the end of a certain time period $T_1$ after the scene transition. This is done based on an experience-derived rule that a main frame is usually in the middle of a scene of a video animation.

Alternatively, since a subject of a main frame of a scene often stands still, there are two adjacent frames included having a close correlation in the same scene, thus yielding a correlation value larger than a certain value. Therefore, either of the two adjacent frames may be printed. For detecting such closely correlated adjacent frames, the constant voltage generator 12 is adapted to set another set value "y" which is smaller than the set value "Y" for detecting a scene transition. As shown in the time chart in FIG. 3, the |A−B| operation circuit 6 and the integration device 9 continue to operate even after the detection of scene transition. When an output X from the integration device 9 is smaller than the set value "y", the two adjacent frames, for example Frame-(m+2) and Frame-(m+3), are judged to be very closely correlated and therefore to be of the same subject standing still. Then, the VTP 1 is paused, and the Frame-(m+3) printed as previously described.

Figure 3:
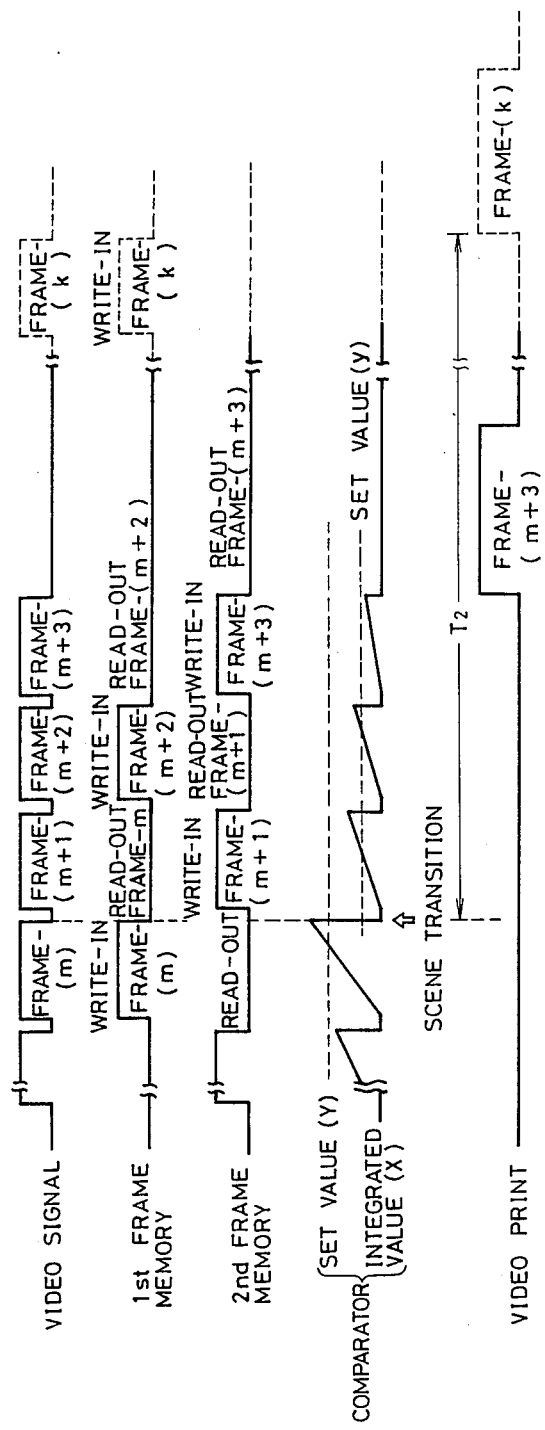
FIG. 3 is a time chart showing operation of a video printer according to another embodiment of the present invention.

In the event there is no frame of a subject standing still in a same scene, it is possible that no print of any frame in the same scene will be made. To prevent such an omission, a time may be set, as shown in FIG. 3. If in fact there is period $T_2$ may be set, as shown in FIG. 3. If in fact there is detected no frame which is closely correlated to the preceding frame adjacent thereto, a Frame-(k) is printed immediately after the lapse of the time period $T_2$.

Figure 4:
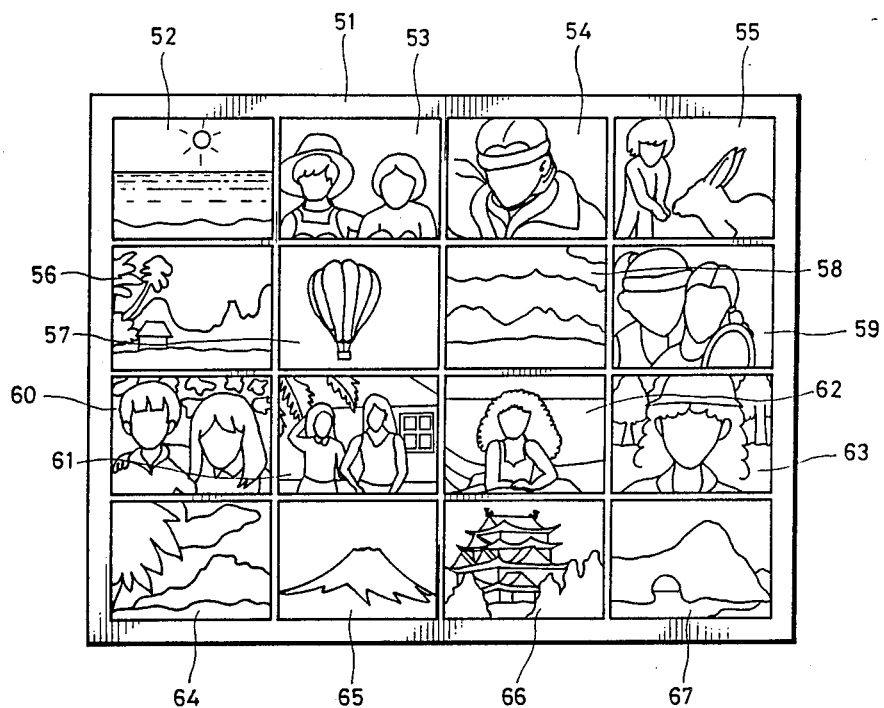
FIG. 4 is an illustration of an index print.

Although, in the embodiments described above, each frame is printed as a single picture print, it is convenient to make a single print of a composite image, including a plurality of frames (one for each scene) as an index print for a video tape. FIG. 4 shows an example of such an index print. Frames 52 through 67 are main frames demonstrating different scenes. After being subjected to gradation and color correction and then reduced in size in the image processing section 8, video signals of each frame are written in a specified area of the frame memory 16. In the same way, the necessary number of frames also are written in different areas of the frame memory 16 on a frame by frame basis, to be electrically composed as a single composite image. The composite image is then displayed on the CRT 25 for printing on the photographic paper 31. By photographically processing the exposed photographic paper 31, an index print 52 having an composite image of the respective main frames 52 to 67 is provided.

For better and finer color correction, it may be desirable to use a color monitor to display a color image of each frame to be printed. By visually inspecting the image displayed on the color monitor, a necessary correction can be effected by inputting a correction value through the keyboard 14.

It is to be noted that the correlative value may be either a mean value or a total value of the differences of video signals between the respective picture elements of each two adjacent frames.

Although the present invention has been fully described in connection with the preferred embodiment thereof with reference to the accompanying drawings, it will be apparent to those skilled in the art that various changes and modifications of the present invention are possible within the scope of the following claims.

What is claimed is:

1. A video printer for making a hard copy of one of a plurality of continuous video images recorded in a video image recording medium, said video printer comprising:

means for detecting a value substantially corresponding to a degree of correlation between each pair of adjacent frames of said continuous video images reproduced time serially.

means for comparing said detected value with a preset value; and means for making a hard copy of a frame which is reproduced a predetermined time period later if said comparing means outputs a comparison value indicative of said detected value being smaller than said preset value.

2. A video printer as defined in claim 1, further including means for copying a plurality of said frames as a single hard copy of a composite image.

3. A video printer as defined in claim 2, further comprising memory means for storing, as video signals, said frame to be copied.

4. A video printer as defined in claim 3, wherein said memory means stores a plurality of said frames as composed video signals which are copied as a single hard copy of a composite image.

5. A video printer as defined in claim 1, wherein said detected value is the reciprocal of a mean value of differences of video signals between respective picture elements of said each two adjacent frames.

6. A video printer as defined in claim 2, wherein said detected value is the reciprocal of a total value of differences of video signals between respective picture elements of said each two adjacent frames.

7. A video printer for making hard copy of one of a plurality of continuous video images recorded in a video image recording medium, said video printer comprising:

means for detecting a value substantially corresponding to a degree of correlation between each two adjacent frames of said continuous video images as time serially reproduced.

means for comparing said detected value with a first value and with a second preset value smaller than said first value, respectively; and means for making a hard copy of one of said each two adjacent frames for which said detected value is larger than said second preset value after a detection of any two adjacent frames of which said detected value is smaller than said first preset value.

8. A video printer as defined in claim 7, wherein said hard copy making means makes hard copy of a frame reproduced at a lapse of a predetermined time period when said detecting means detects no value larger than said second preset value.

9. A video printer as defined in claim 7, further including means for copying a plurality of said frames as a single hard copy of a composite image.

10. A video printer as defined in claim 8, further including means for copying a plurality of said frames as a single hard copy of a composite image.

11. A video printer as defined in claim 7, further comprising memory means for storing, as video signals, said frame to be copied.

12. A video printer as defined in claim 8, further comprising memory means for storing as video signals, said frame to be copied.

13. A video printer as defined in claim 11, wherein said memory means stores a plurality of said frames as composed video signals which are copied as a single hard copy of a composite image.

14. A video printer as defined in claim 7, wherein said value is the reciprocal of a mean value of difference of video signals between respective picture elements of said each tow adjacent frames.

15. A video printer as defined in claim 7, wherein said value is the reciprocal of a total value of differences of video signals between respective picture elements of said each two adjacent frames.

* * * * *